United States Patent
Oda

(10) Patent No.: US 10,083,138 B2
(45) Date of Patent: Sep. 25, 2018

(54) CONTROLLER, BUS CIRCUIT, CONTROL METHOD, AND RECORDING MEDIUM

(71) Applicant: NEC Corporation, Minato-ku, Tokyo (JP)

(72) Inventor: Shinya Oda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 405 days.

(21) Appl. No.: 15/053,095

(22) Filed: Feb. 25, 2016

(65) Prior Publication Data

US 2016/0267034 A1    Sep. 15, 2016

(30) Foreign Application Priority Data

Mar. 9, 2015   (JP) .................................. 2015-045486

(51) Int. Cl.
*G06F 13/00*    (2006.01)
*G06F 13/364*    (2006.01)
*G06F 13/42*    (2006.01)
*G06F 13/40*    (2006.01)

(52) U.S. Cl.
CPC .......... *G06F 13/364* (2013.01); *G06F 13/404* (2013.01); *G06F 13/4282* (2013.01)

(58) Field of Classification Search
None
See application file for complete search history.

(56) References Cited

U.S. PATENT DOCUMENTS

| 6,055,656 A * | 4/2000 | Wilson, Jr. ..... G01R 31/318572 714/724 |
| 2008/0046603 A1* | 2/2008 | Kobayashi ............ G06F 11/364 710/17 |

FOREIGN PATENT DOCUMENTS

| JP | 61-177047 A | 8/1986 |
| JP | H05-342145 A | 12/1993 |
| JP | H07-200420 A | 8/1995 |
| JP | 10-023046 A | 1/1998 |
| JP | H10-222204 A | 8/1998 |
| JP | 2007-249505 A | 9/2007 |
| JP | 2011-070282 A | 4/2011 |
| JP | 2012-068907 A | 4/2012 |
| WO | 2010/021054 A1 | 2/2010 |

OTHER PUBLICATIONS

Japanese Office Action for JP Application No. 2015-045486 dated Dec. 6, 2016 with English Translation.
Japanese Office Action for JP Application No. 2015-045486 dated Apr. 5, 2016 with English Translation.

* cited by examiner

*Primary Examiner* — Idriss N Alrobaye
*Assistant Examiner* — Richard B Franklin

(57) ABSTRACT

A controller includes a pseudo device circuit connected to a target device with a bus and a reset line, the pseudo device circuit acquiring from the bus an instruction input to the target device and a response to the instruction input, predicting a response of the target device to the instruction acquired, and outputting a fault report when a difference is detected between a predicted response and an acquired response, and outputting a reset signal to the reset line; and a master circuit connected to the target device with the bus, the master circuit transmitting the instruction to the target device through the bus, and performing initial setting of the target device based on the fault report from the pseudo device circuit.

10 Claims, 4 Drawing Sheets

CONTROLLER, BUS CIRCUIT, CONTROL METHOD, AND RECORDING MEDIUM

INCORPORATE BY REFERENCE

This application is based upon and claims the benefit of priority from Japanese Patent Application No. 2015-045486, filed on Mar. 9, 2015, the disclosure of which is incorporated herein in its entirety by reference.

TECHNICAL FIELD

The invention relates to a controller, a bus circuit, a control method and a recording medium, especially a controller or the like for taking countermeasures against a failure of a bus for connecting a device.

BACKGROUND ART

PTL 1 discloses a communication system using an IIC (Inter-Integrated-Circuit) bus (also known as I2C bus). The I2C bus is a 2-wire low-speed interface, and is used as a bus for managing various kinds of information processing apparatuses such as computers, for example an on-vehicle computer, a network apparatus, a hand-held device.

PTL 2 discloses a system having an input/output module doubled. In the system, an input from the process is received by both operation and standby I/O (Input/Output) modules, but an output to the process is performed only by the operation I/O (Input/Output) module.

CITATION LIST

Patent Literature

PTL 1: Japanese Unexamined Patent Application Publication No. 2011-070282
PTL 2: Japanese Unexamined Patent Application Publication No. H10-222204

SUMMARY

Technical Problem

The I2C bus does not have a function to protect communication content or a bus protocol. When an operation of the bus or a device connected to the bus becomes abnormal by some cause, the device using the bus is required to reset the bus and all devices connected to the bus for restoration, and operate the bus from an initial state again. Therefore, the abnormal operation of the bus and the devices connected to the bus significantly influences the devices which use the bus.

An exemplary object of the invention to provide a controller or the like for reducing the influence as stated above.

Solution to Problem

A control device according to one aspect of the invention includes: a pseudo device circuit connected to a target device with a bus and a reset line, the pseudo device circuit acquiring from the bus an instruction input to the target device and a response to the instruction input, predicting a response of the target device to the instruction acquired, and outputting a fault report when a difference is detected between a predicted response and an acquired response, and outputting a reset signal to the reset line; and a master circuit connected to the target device with the bus, the master circuit transmitting the instruction to the target device through the bus, and performing initial setting of the target device based on the fault report from the pseudo device circuit.

A control method is performed by a controller connected to a target device with a bus and a reset line according to one aspect of the invention. The control method includes: acquiring from the bus an instruction input to the target device and a response to the instruction input; predicting a response of the target device to the instruction acquired; and outputting a fault report when a difference is detected between a predicted response and an acquired response, and outputting a reset signal to the reset line; and performing initial setting of the target device based on the fault report from the pseudo device circuit.

A non-transitory computer-readable medium according to one aspect of the invention, stores a program which causes a computer connected to a target device with a bus and a reset line to: acquire from the bus an instruction input to the target device and a response to the instruction input; predict a response of the target device to the instruction acquired; and output a fault report when a difference is detected between a predicted response and an acquired response, and output a reset signal to the reset line; and perform initial setting of the target device based on the fault report from the pseudo device circuit.

Advantageous Effects of Invention

An exemplary advantage according to the invention is able to reduce the influence when an operation of the bus or a device connected to the bus becomes abnormal.

EXEMPLARY EMBODIMENT

First Exemplary Embodiment

Figure 1:
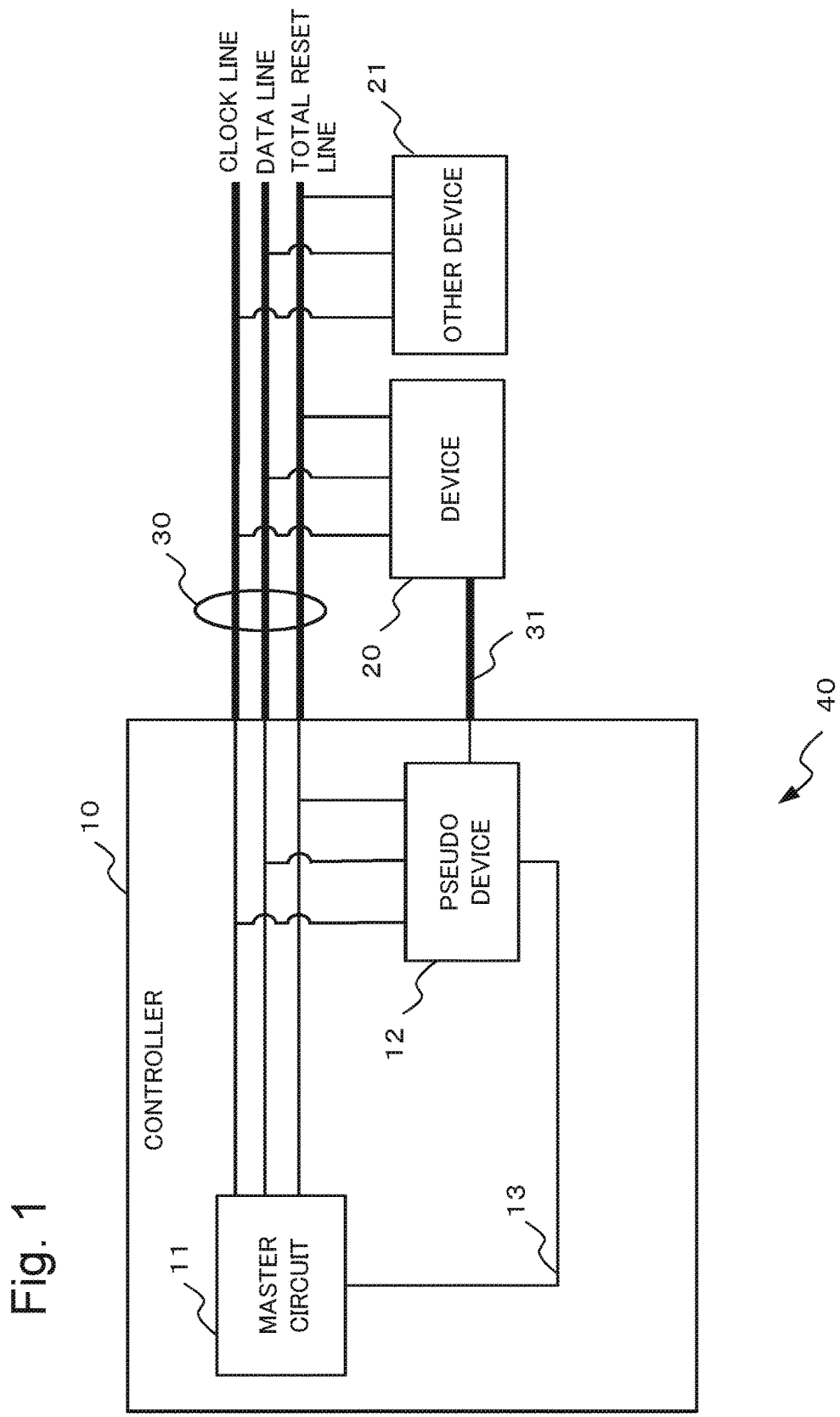
FIG. 1 is a configuration diagram of the bus circuit according to a first exemplary embodiment of the invention.

FIG. 1 is a configuration diagram of the bus circuit 40 according to the first exemplary embodiment of the invention. The bus circuit 40 is incorporated into for example an information apparatus or a mobile phone, and used for controlling a peripheral device. The bus circuit 40 may be incorporated into an on-vehicle computer, a network apparatus or a hand-held apparatus.

The bus circuit 40 includes a controller 10, a target device 20, a non-target device 21, a bus 30 and a reset line 31. The controller 10, the target device 20 and the non-target device (other device) 21 are respectively connected to the buses 30. The controller 10 and the target device 20 are connected by a reset line 31 other than the buses 30. Additionally, FIG. 1 shows a configuration that the bus circuit 40 includes one target device 20 and one non-target device 21, but the configuration is not limited thereto. For example, the bus circuit 40 may be a configuration that includes a plurality of target devices 20 or a plurality of non-target devices 21. The bus circuit 40 may be a configuration that does not include a non-target device 21.

The bus 30 includes, for example, 3 signal lines of a clock line, a data line and a total reset line, out of which the clock line and the data line constitute the 12C bus.

The controller 10 is, for example, an FPGA (Field Programmable Gate Array). The controller 10 includes a master circuit 11 and a pseudo device 12. As shown in FIG. 1, both the master circuit 11 and the pseudo device 12 are connected to the bus 30. The master circuit 11 and the pseudo device 12 are mutually connected with a fault report line 13. Further, the pseudo device 12 is connected through the reset line 31 to the target device 20 within the bus circuit 40. When the bus circuit 40 includes a plurality of target devices 20, the pseudo device 12 is connected through a reset line 31 corresponding to each of a plurality of the target devices 20.

The master circuit 11 instructs and controls the target device 20 and the non-target device 21 connected on the bus 30.

One example of the target device 20 and the non-target device 21 is a sensor. The target device 20 and the non-target device 21 receive an instruction from the master circuit 11, perform operation as a sensor and perform notification of a sensor state to the master circuit 11 through the bus 30. The target device 20 and the non-target device 21 output data to the bus 30 in response to a transaction from the master circuit 11 without issuing a transaction to the bus 30 voluntarily.

An instruction issued by the master circuit 11 includes addresses of the target device 20 and the non-target device 21, and the target device 20 and the non-target device 21 respond to an instruction including the respective own addresses.

A difference between the target device 20 and the non-target device 21 is whether they become a monitoring and control object of the pseudo device 12 or not. The target device 20 becomes a monitoring and control object of the pseudo device 12, and the non-target device does not become a monitoring and control object of the pseudo device 12. Thus, the bus circuit 40 can be configured not to include a non-target device 21.

The pseudo device 12 acquires an instruction input to the target device 20 from the bus 30, and performs a prediction for a response to the acquired instruction. Further, the pseudo device 12 acquires a response which the target device 20 outputs to the bus 30, and checks whether there is a difference between the predicted response and the acquired response. When the difference is detected, the pseudo device 12 outputs a fault report to the fault report line 13, and outputs a reset signal of the target device 20 to the reset line 31. The pseudo device 12 does not correspond to an instruction including an address of the non-target device that is not a monitoring and control object.

The pseudo device 12 stores, for example, a response candidate list to an instruction, and may include an acquisition unit (not shown) that acquires a kind of parameter which influences a selection of a response, and a parameter value, in order to perform a prediction of a response of the target device 20 to an acquired instruction for the target device 20.

For example, when a value of an internal register of the target device 20 is included in the parameter, the pseudo device 12 includes the same register as the target device 20. The pseudo device 12 judges an update trigger of a value of the internal register of the target device 20 from the acquired instruction, and updates the register of its own device in the same manner. Furthermore, when there is a system parameter of the device which uses the bus circuit 40 in the parameter, the pseudo device 12 may include a reference unit (not shown) of the parameter value.

Further, when the target device 20 outputs a numeric value as a response, the pseudo device 12 may store the number range. The pseudo device 12 may predict the range, even when the complete prediction of the outputted numeric value cannot be performed, and check whether the outputted value of the target device 20 is settled within the range.

Furthermore, when the target device 20 is a sensor, the pseudo device 12 may be designed to perform the same action as the target device 20 except that an actual sensing operation is not performed. That is, the pseudo device 12 may be designed to perform the same action as the target device 20 in the aspect of the action on the bus 30 and the operation of the internal register.

Further, the pseudo device 12 have only to predict accuracy corresponding to the abnormality detection accuracy, or may predict presence or absence of the response to the instruction.

The reset line 31 is a signal line for the pseudo device 12 to transmit a reset signal to the target device 20, when an operation abnormality or a fault symptom of the target device 20 is detected.

The fault report line 13 is a signal line for the pseudo device 12 to transmit a fault report to the master circuit 11, when an operation abnormality or a fault symptom of the target device 20 is detected.

As one example of the bus circuit 40, the target device 20, the non-target device 21, and the master circuit 11 of the controller 10 and the pseudo device 12 are constituted of a logic circuit.

The controller 10 may be constituted of a computer. In this case, the function of the master circuit 11 or the pseudo device 12 is realized by the program executed by a processor not-shown. The target device 20 may be also constituted of a computer, and its function is realized by the program executed by a processor not-shown in the figure. The above program may be firmware.

Flow of Operations

Figure 2:
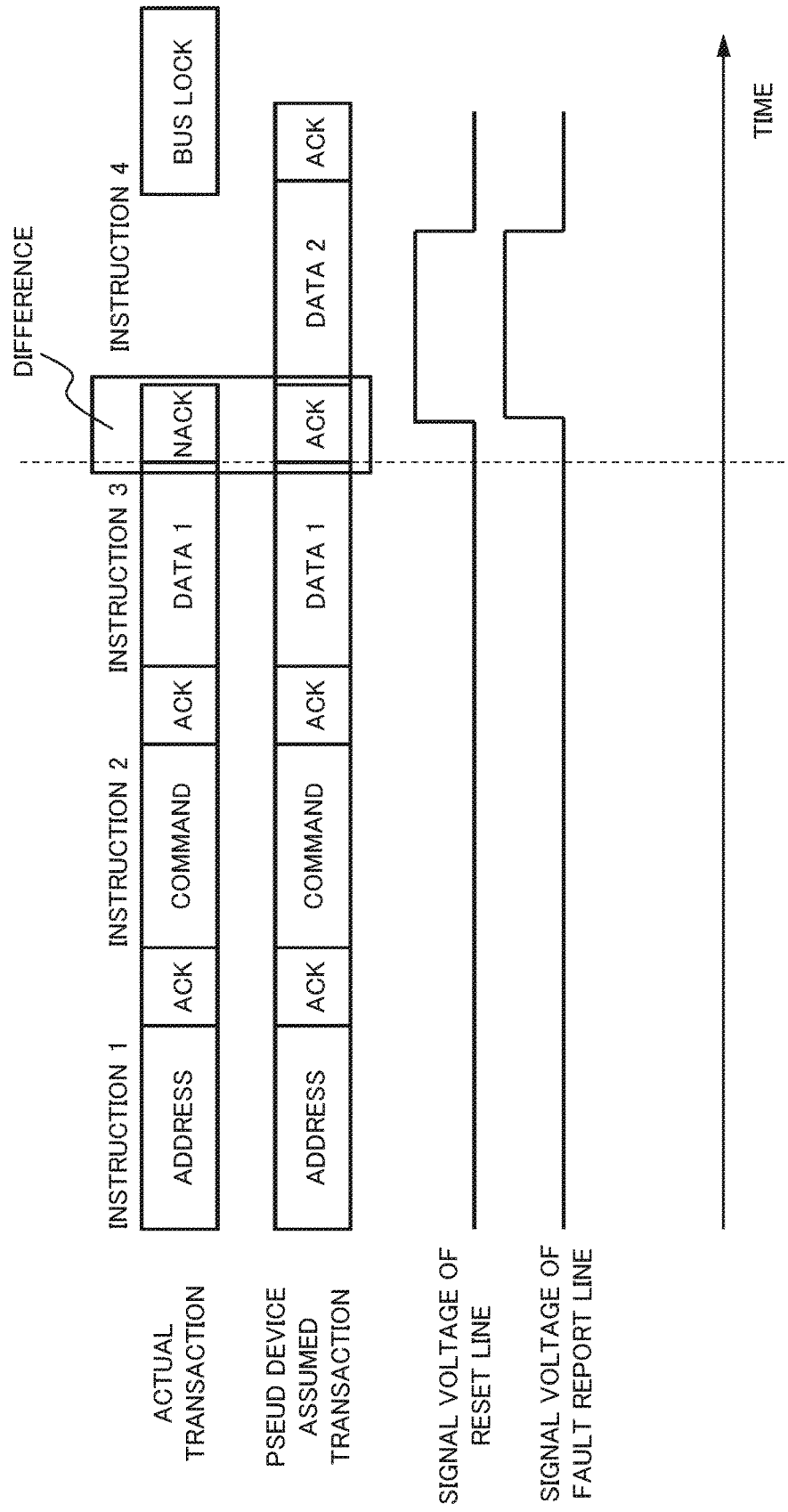
FIG. 2 is a time chart showing an example that a target device becomes abnormal while the bus circuit performs the instruction sequence shown by an actual transaction.

FIG. 2 is a time chart showing an example that the target device 20 becomes abnormal while the bus circuit 40 performs the instruction sequence shown by an actual transaction. In FIG. 2, time progresses to the right.

At the time of executing the actual transaction of FIG. 2, the master circuit 11 outputs a series of instructions consisting of an address, an command, a data 1 and data 2 to the bus 30 in order to operate the target device 20. This actual transaction causes the target device 20 having the address or the non-target device 21 to execute an operation defined by the command, data 1 and data 2, for example a measuring operation by a sensor.

In this example, the address transmitted according to the instruction 1 is an address of the target device 20. The target device 20 that receives the address of the target device 20 from the bus according to the instruction 1, and the pseudo device 12, start an operation.

First, the target device 20 recognizes that the address received according to the instruction 1 is from its own device, and transmits an acknowledgement (ACK) to the master circuit 11 through the bus 30.

The pseudo device 12 also recognizes that the address received according to the instruction 1 is from the target device 20, and predicts an ACK. The sequence of the instruction and response that the pseudo device 12 predicts is shown as a pseudo device assumed transaction in FIG. 2.

However, the pseudo device 12 does not transmit the predicted ACK to the bus 30. The pseudo device 12 receives the ACK response of the target device 20 from the bus 30, and confirms that it corresponds with the prediction. That is, the pseudo device 12 confirms the normal operation of the target device 20.

Next, the target device 20 recognizes that the command received according to the instruction 2 is executable by its own device, and transmits the ACK to the master circuit 11 through the bus 30.

The pseudo device 12 also recognizes that the command received according to the instruction 2 is executable by the target device 20, and predicts an ACK. However, the pseudo device 12 does not transmit the predicted ACK to the bus 30. The target device 20 receives the ACK response of the target device 20 from the bus 30, and confirms that it corresponds with the prediction. That is, the pseudo device 20 confirms the normal operation of the target device 20.

Subsequently, the target device 20 transmits a negative acknowledgement (NACK) to the master circuit 11 through the bus 30 for the reason that the data 1 received according to the instruction 3 is unreasonable. In this example, this is a malfunction of the target device 20.

On the other hand, the pseudo device 12 recognizes that the data 1 received according to the instruction 3 is reasonable for the command execution received according to the instruction 2, and predicts an ACK. However, the pseudo device 12 does not transmit the predicted ACK to the bus 30. The pseudo device 12 receives the NACK response of the target device 20 from the bus 30, and confirms that the NACK response is different from the prediction. That is, the pseudo device 20, at this point, detects an abnormality of the target device 20.

In this example, the ACK is a normal response and the NACK is an abnormal response, which, however, does not necessarily correspond to all the cases. For example, when the address of the non-target device 21 is transmitted as an instruction, if the target device 20 returns the ACK, it is an abnormal response. A normal/abnormal response is determined according to the correspondence/difference with/from the prediction that the pseudo device 12 performs.

The pseudo device 12 that detects an abnormality of the target device 20 outputs a reset signal to the reset line 31, and outputs a fault report to the fault report line 13. The fault report includes an address of the target device 20.

FIG. 2 shows a state that a signal voltage of the reset line 31 is increased for a certain period when a reset signal is transmitted to the reset line 31, and a signal voltage of the fault report line 13 is increased for a certain period when a fault report is transmitted to the fault report line 13.

When the target device 20 receives the reset signal from the reset line 31, the target device 20 is returned to an initial state. Then, the master circuit 11 performs initial setting of the target device 20 specified by an address of the fault report, and restarts the target device 20. When the master circuit 11 confirms the restart of the target device 20, for example, the transaction which is abnormally terminated is transmitted to the bus 30 again.

Here, the initial setting of the target device 20, which the master circuit 11 performs, means various settings for operating the target device 20 that is completely returned to the initial state by reset. Specifically, when the target device 20 is a temperature sensor, the master circuit 11 sets an upper limit threshold and a lower limit threshold of the temperature sensor, or performs a setting for giving interruption or a setting of a conversion time and accuracy.

When a device connected to the bus is in an abnormal state in the control using the bus I2C, an internal sequencer such as other device or the like connected to the bus may also be in an abnormal state. For example, as shown in FIG. 2, the bus 30 may be in a bus lock state in the next transaction.

Here, the bus lock state is a state that a voltage of the bus 30 is locked to a constant value by bus sequence mismatch or the like. For example, when the bus lock is generated, the master circuit 11 cannot issue a subsequent transaction to the bus. When the bus lock is generated, the master circuit 11 must perform a reset and initial setting of the bus 30, the target device 20 and the non-target device 21 connected thereto, and an adverse effect expands. An uncontrollable time due to the reset and initial setting becomes a significant obstacle when the processing must be performed within a fixed period.

Effects of First Exemplary Embodiment

The controller 10 of the exemplary embodiment prevents a bus lock of the bus 30 to limit an influence range of a fault. This is because, the pseudo device 12 can detect the abnormality and reset the target device 20 at a precursory stage before reaching a subsequent bus lock, even when the target device 20 connected to the bus 30 operates abnormally.

Further, the controller 10 of the exemplary embodiment facilitates fault analysis of the target device 20. This is because the pseudo device 12 can find a wrong position as a response of the target device 20 to detect it as an omen of the fault, even if it is correct as a transaction on the bus 30. For example, when the target device 20 is a temperature sensor, a measured value of the temperature sensor is detected as an omen of the fault in the case that it deviates from a predicted range. Alternatively, the detection, for example, is detected as an omen of the fault, when the target device 20 responds with another value in a state where the response is fixed to 0 or 1.

Generally, a plurality of target devices 20 and non-target devices 21 are connected to the bus 30. A malfunction of a certain target device 20 may influence a transaction to another target device 20 or non-target device 21 later. When a fault is generated due to the influence, it is difficult to specify a fault cause. The controller 10 of the exemplary embodiment improves this situation.

Furthermore, the controller 10 of the exemplary embodiment enables a creator/manager of a device using the bus circuit 40 to exploit the invention without paying the cost to add the pseudo device 12. This is because the pseudo device 12 is previously incorporated in the controller 10.

Modified Example of First Exemplary Embodiment

The first exemplary embodiment is described, using the example that the master circuit 11 and the pseudo device 12 is included in the controller 10, but not limited hereto. For example, the bus circuit 40 may include the master circuit 11 and the pseudo device 12 together with the target device 20, the non-target device 21, the bus 30 and the reset line 31.

The bus 30 is not limited to the one which uses the I2C bus. When the target device 20 can be connected and its instruction and response can be monitored from the pseudo device 12 connected to the same bus 30, the bus 30 may be a bus of other specification.

Second Exemplary Embodiment

Figure 3:
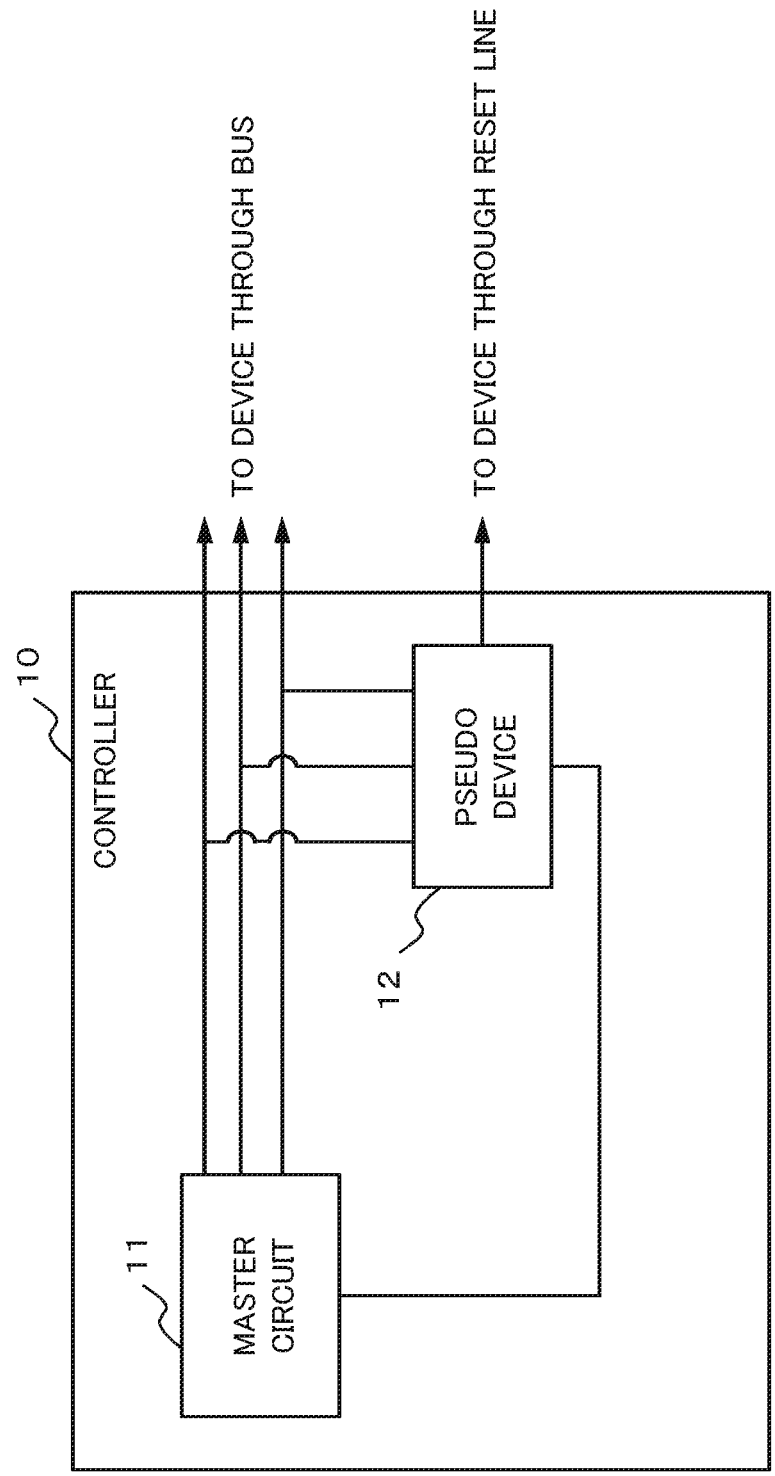
FIG. 3 is a configuration diagram of the controller according to a second exemplary embodiment of the invention.

FIG. 3 is a configuration diagram of a controller 10 according to the second exemplary embodiment of the invention.

The controller 10 of the exemplary embodiment performs a predetermined operation in response to an instruction received from a bus to output a response to the bus, and is connected to a target device which is reset by a signal received from the reset line, with the bus and the reset line. Further, the controller 10 includes the master circuit 11 and the pseudo device 12.

The pseudo device 12 acquires an instruction input to the target device and its response from the bus to predict a response to the acquired instruction. When a difference between the predicted response and the acquired response is detected, the pseudo device 12 outputs a fault report to the master circuit 11 and also outputs the above-described signal to the reset line.

The master circuit 11 transmits an instruction to the bus. When the master circuit 11 receives a fault report from the pseudo device 12, the initial setting of the target device is executed.

The controller 10 of the exemplary embodiment prevents a bus lock of the bus to limit an influence range of the fault. This is because the pseudo device 12 can detect the abnormality and reset the device at a precursory stage before reaching a subsequent bus lock, even when the target device connected to the bus operates abnormally.

Furthermore, the controller 10 of the exemplary embodiment enables a creator/manager of a mobile phone or the like using the controller 10 to exploit the invention without paying the cost to add the pseudo device 12. This is because the pseudo device 12 is previously incorporated in the controller 10.

Figure 4:
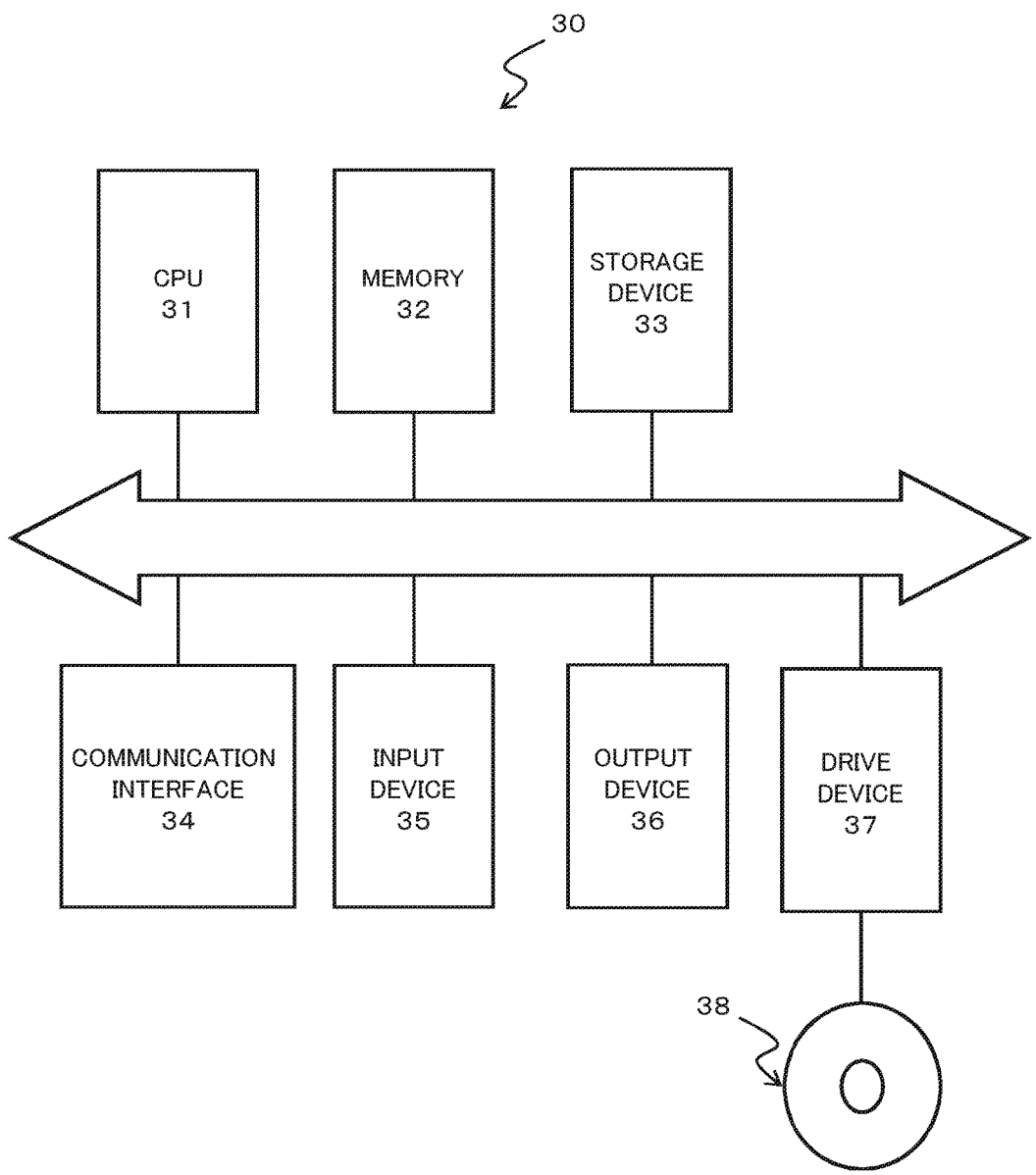
FIG. 4 is a diagram showing one example of a hardware configuration for implementing a controller or a target device in each exemplary embodiment, by a computer.

FIG. 4 is a diagram showing one example of a hardware configuration for achieving the controller 10 or the target device 20 in each exemplary embodiment by a computer 30. The computer 30 constituting the controller 10 or the target device 20 includes a CPU (Central Processing Unit) 31, a memory 32, a storage device 33 and a communication interface 34. The computer 30 may include an input device 35 or an output device 36. The function of the controller 10 or the target device 20 is realized by the CPU 31, for example, which executes a computer program (a software program, hereinafter just described as "a program") read out by the memory 32. In the execution, the CPU 31 appropriately controls the communication interface 34, the input device 35 and the output device 36. The invention for which each exemplary embodiment is described as an example is also constituted of a nonvolatile recording medium 38 such as a compact disk in which the program is stored. The program which is stored by the recording medium 38 is read out, for example, by the drive device 37.

The previous description of embodiments is provided to enable a person skilled in the art to make and use the invention. Moreover, various modifications to these exemplary embodiments will be readily apparent to those skilled in the art, and the generic principles and specific examples defined herein may be applied to other embodiments without the use of inventive faculty. Therefore, the invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

REFERENCE SIGNS LIST

10 Controller
11 Master circuit
12 Pseudo device
13 Fault report line
20 Target device
21 Non-target device
30 Bus
31 Reset line
40 Bus circuit

The invention claimed is:

1. A controller comprising:
    a pseudo device circuit connected to a target device with a bus and a reset line, the pseudo device circuit acquiring from the bus an instruction input to the target device and a response to the instruction input, predicting a response of the target device to the instruction acquired, and outputting a fault report when a difference is detected between a predicted response and an acquired response, and outputting a reset signal to the reset line; and
    a master circuit connected to the target device with the bus, the master circuit transmitting the instruction to the target device through the bus, and performing initial setting of the target device based on the fault report from the pseudo device circuit.

2. The controller according to claim 1, wherein the pseudo device circuit detects the difference between a predicted response and an acquired response, based on a determination as to whether the acquired response is a normal response or an abnormal response or a data value that included in the acquired response falls within a predetermined range or not.

3. A bus circuit comprising: the controller according to claim 2;
    a target device; and
    a bus connecting the controller and the target device.

4. A bus circuit comprising: the controller according to claim 1;
    a target device; and
    a bus connecting the controller and the target device.

5. The bus circuit according to claim 4 further comprising:
    a non-target device connected to the bus,
    wherein the master circuit transmits a command of the target device and a command of the non-target device, and resets the target device, the non-target device and the bus to perform initial setting when detecting bus lock of the bus.

6. The bus circuit according to claim 5, wherein
    the master circuit transmits the instruction including an address of the target device or the non-target device,
    the target device performs a predetermined operation when the instruction received includes an address of own device, and
    the pseudo device circuit predicts the predicted response when the instruction acquired includes an address of the target device.

7. A control method of a controller connected to a target device with a bus and a reset line, the control method comprising:
    acquiring from the bus an instruction input to the target device and a response to the instruction input;
    predicting a response of the target device to the instruction acquired; and
    outputting a fault report when a difference is detected between a predicted response and an acquired response, and outputting a reset signal to the reset line; and
    performing initial setting of the target device based on the fault report from the pseudo device circuit.

8. The control method of the controller according to claim 7, wherein the difference between the predicted response and the acquired response is detected, based on a determination as to whether the acquired response is a normal response or an abnormal response or a data value that included in the acquired response falls within a predetermined range or not.

9. A non-transitory computer-readable medium storing a program which causes a computer connected to a target device with a bus and a reset line to:
  acquire from the bus an instruction input to the target device and a response to the instruction input;
  predict a response of the target device to the instruction acquired; and
  output a fault report when a difference is detected between a predicted response and an acquired response, and output a reset signal to the reset line; and
  perform initial setting of the target device based on the fault report from the pseudo device circuit.

10. The computer-readable medium according to claim 9, wherein a program is stored which causes to perform detecting a difference between a predicted response and an acquired response based on a determination as to whether the acquired response is a normal response or an abnormal response or a data value that included in the acquired response falls within a predetermined range or not.

* * * * *